(12) United States Patent
Stewart et al.

(10) Patent No.: US 7,565,839 B2
(45) Date of Patent: Jul. 28, 2009

(54) BIAS AND QUADRATURE REDUCTION IN CLASS II CORIOLIS VIBRATORY GYROS

(75) Inventors: Robert E. Stewart, Woodland Hills, CA (US); Stanley F. Wyse, Encino, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 78 days.

(21) Appl. No.: 11/499,957

(22) Filed: Aug. 7, 2006

(65) Prior Publication Data

US 2007/0039386 A1  Feb. 22, 2007

(51) Int. Cl.
G01C 19/56 (2006.01)
G01P 9/04 (2006.01)

(52) U.S. Cl. .................. 73/504.12; 73/504.13

(58) Field of Classification Search ........... 73/504.02, 73/504.04, 504.12, 504.13, 504.14, 504.15
See application file for complete search history.

(56) References Cited

U.S. PATENT DOCUMENTS 5,256,929 A * 10/1993 Terajima ............... 310/326
5,629,472 A *  5/1997 Varnham et al. ......... 73/1.37
6,357,296 B1 *  3/2002 Baker et al. ............ 73/504.13
6,481,285 B1 * 11/2002 Shkel et al. ............ 73/504.13
6,915,215 B2 *  7/2005 M'Closkey et al. ......... 702/32
6,934,660 B2 *  8/2005 Painter et al. ............ 702/141
6,934,665 B2 *  8/2005 Rober .................... 702/189

FOREIGN PATENT DOCUMENTS

EP  0 141 621  5/1985
EP  1 571 417  9/2005
EP  1 752 735  2/2007

* cited by examiner

*Primary Examiner*—Helen C. Kwok
(74) *Attorney, Agent, or Firm*—Carmen Patti Law Group, LLC

(57) ABSTRACT

The method and apparartus in one embodiment may have the steps of: providing a two-dimensional axisymmetric oscillator having a beam containing two principal elastic axes and two principal damping axes; driving the beam with drive components to oscillate; driving, during a first period, the beam along a drive axis of the beam in a direction normal to one pair of faces of the beam while Coriolis coupled vibration is sensed along a sense axis of the beam normal to an orthogonal pair of faces of the beam; reversing, during a second period, drive and sense axes driving the beam; reducing a bias of the beam to zero; and reducing a quadrature of the beam to zero.

26 Claims, 4 Drawing Sheets

Vibrating Beam Dynamic Model

Vibrating Beam Dynamic Model

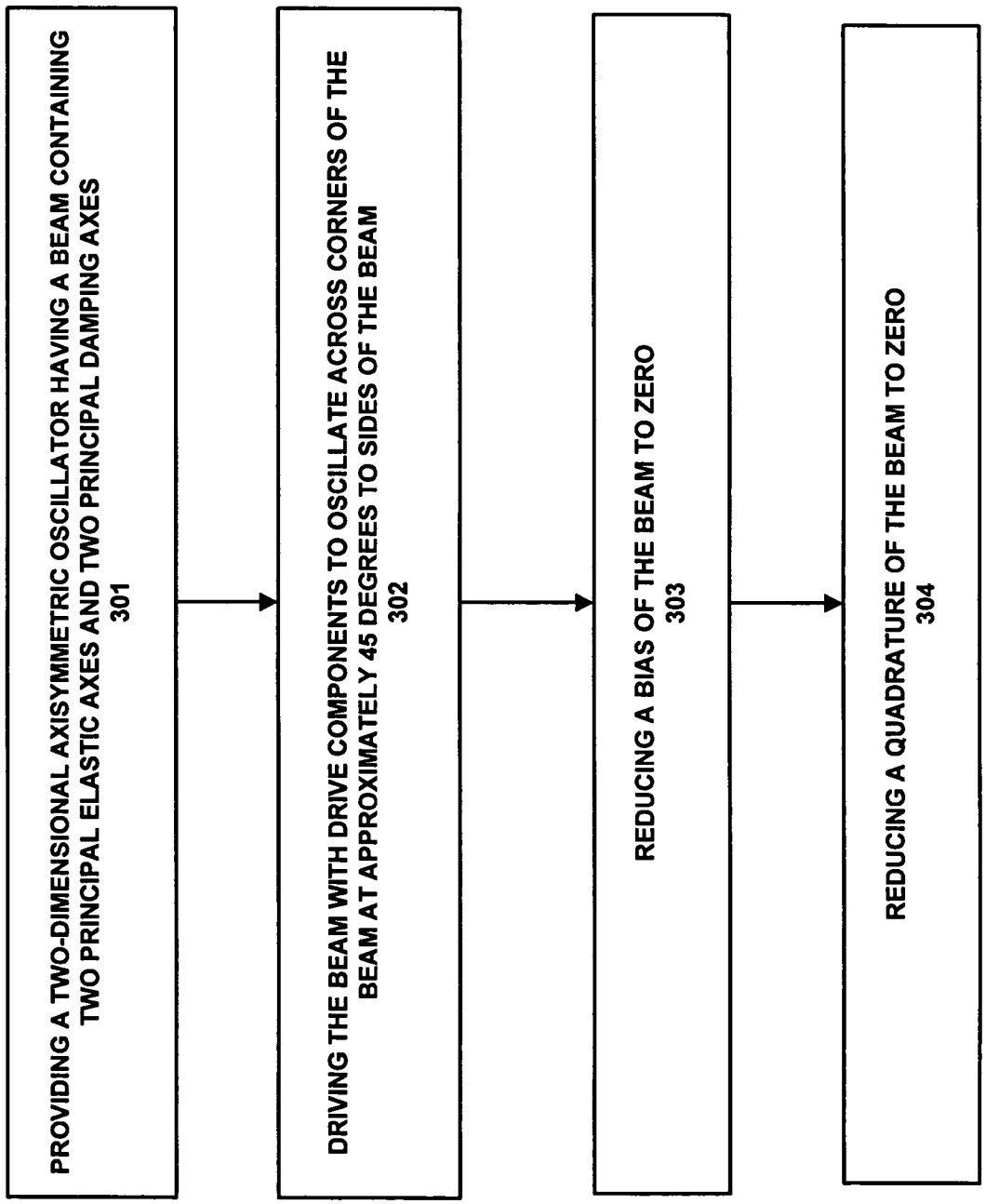

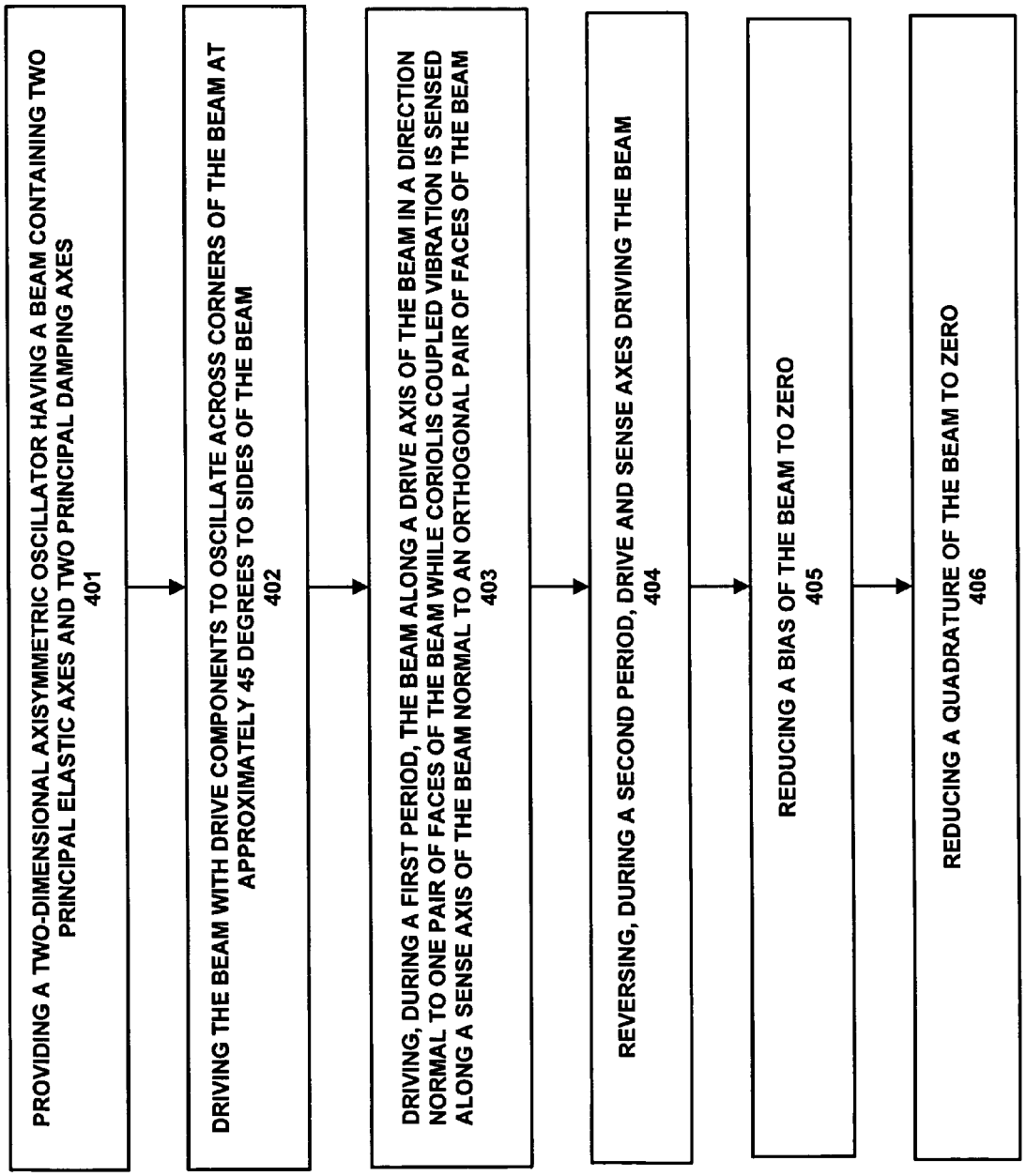

BIAS AND QUADRATURE REDUCTION IN CLASS II CORIOLIS VIBRATORY GYROS

CROSS-REFERENCE TO RELATED APPLICATIONS

This application contains subject matter that is related to the subject matter of the following application, which is assigned to the same assignee as this application.

"Vibratory Gyro Bias Error Cancellation Using Mode Reversal", Ser. No. 11/499,958, filed Aug. 7, 2006.

"Method for Modifying the Location of Nodal Points of a Vibrating Beam", Ser. No. 11/499,956, filed Aug. 7, 2006.

The below-listed application is hereby incorporated herein by reference in its entirety. "Oscillation of Vibrating Beam in a First Direction for a First Time Period and a Second Direction for a Second Time Period to Sense Angular Rate of the Vibrating Beam," by Robert E. Stewart, application Ser. No. 11/057,324, filed Feb. 11, 2005.

TECHNICAL FIELD

The invention relates generally to electromechanical systems and more particularly to drive and sense modes of vibrating beams.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures an angular rate (e.g., rotation). The gyroscope in one example comprises a vibrating beam with high Q degenerate fundamental modes of vibration. For example, high Q vibrating beams require little energy to sustain vibration. The vibrating beam in one example is employable for high performance closed loop angular rate sensing. The vibrating beam in another example is employable for lower performance open loop angular rate sensing. The mathematical model of the symmetrical vibrating beam is in many aspects similar to a vibrating ring or hemispherical resonator gyroscope ("HRG"). The analytical similarity to the hemispherical resonator gyroscope indicates that the vibrating beam gyroscope has the potential of achieving similar performance.

Drive components coupled with the vibrating beam cause a first oscillation of the vibrating beam. An angular rate of the vibrating beam and the first oscillation induce a Coriolis force on the vibrating beam. For example, the angular rate is about the longitudinal axis of the vibrating beam. The Coriolis force causes a second oscillation of the vibrating beam. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating beam.

There is a need in the art for an improved coriolis vibratory gyro that reduces, compensates, or eliminates in real time the sources of gyro bias and quadrature.

SUMMARY

One embodiment of the present method and apparatus encompasses an apparatus. The apparatus may comprise: a beam in a vibrating beam gyro; drive components operatively coupled to the beam, the drive components driving the beam to oscillate; and a Coriolis induced vibration in two orthogonal faces of the beam, means for reducing a bias of the beam to zero; and means for reducing a quadrature of the beam to zero Another embodiment of the present method and apparatus encompasses a method. The method may comprises: providing a two-dimensional axisymmetric oscillator having a beam containing two principal elastic axes and two principal damping axes; driving the beam with drive components to oscillate; reducing a bias of the beam to zero; and reducing a quadrature of the beam to zero.

DESCRIPTION OF THE DRAWINGS

Features of embodiments of the invention will become apparent from the description, the claims, and the accompanying drawings in which:

FIG. 3 depicts an embodiment of a method according to the present method; and

FIG. 4 depicts another embodiment of a method according to the present method.

DETAILED DESCRIPTION

Vibratory gyros may be a collective name for mechanical devices that in various ways use Coriolis acceleration to sense rotation. These gyros appear in a large number of shapes and are also known as tuning forks, vibrating disks, vibrating wine glass etc.

Figure 1:
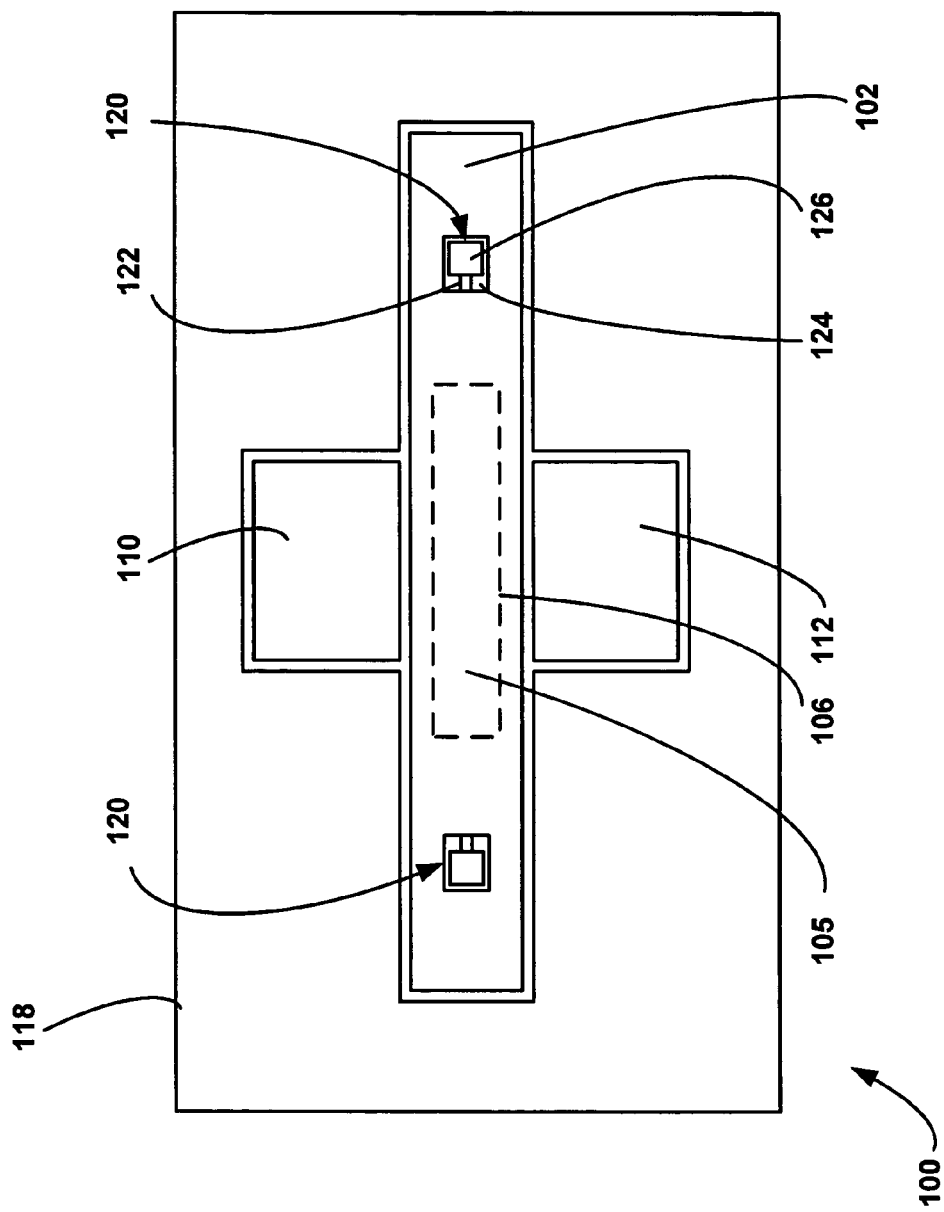
FIG. 1, depicts an apparatus having a micro-electromechanical system ("MEMS") gyroscope.

Turning to FIG. 1, an apparatus 100 in one embodiment comprises a micro-electromechanical system ("MEMS") gyroscope. The gyroscope is employable for high accuracy navigation angular rate sensing. The apparatus 100 in one example has a vibrating beam 102 and a plurality of drive/sensor components 105, 106, 110, and 112. Depending on an oscillation mode of the vibrating beam 102, a first subgroup of the drive/sensor components 105, 106, 110, and 112 drive a first oscillation of the vibrating beam 102 and a second subgroup of the drive/sensor components 105, 106, 110, and 112 sense a second Coriolis induced oscillation of the vibrating beam 102.

In one example, the drive oscillation of the vibrating beam 102 is along a first direction (e.g., out-of-plane). So, the drive/sensor components 105 and 106 serve as drive components for the vibrating beam 102 and the drive/sensor components 110 and 112 serve as pickoff/forcer rebalance components for the vibrating beam 102. In another example, the drive oscillation of the vibrating beam 102 is along a second direction (e.g., in-plane). So, the drive/sensor components 110 and 112 serve as drive components for the vibrating beam 102 and the drive/sensor components 105 and 106 serve as pickoff/forcer rebalance components for the vibrating beam 102.

The vibrating beam 102 comprises one or more nodal axes for vertical oscillation (e.g., vertical vibration). For example, vertical oscillation of the vibrating beam 102 may occur about the nodal axes. The vibrating beam 102 may also have one or more nodal axes for horizontal oscillation (e.g., horizontal vibration). For example, horizontal oscillation of the vibrating beam 102 may occur about the nodal axes. The nodal axis for vertical oscillation and the nodal axis for horizontal oscillation in one example intersect at a nodal point 126. The nodal point 126 remains substantially still for oscillation in any one or more of a plurality of substantially perpendicular directions. For example, the nodal point 126 remains substantially still during both vertical oscillation and horizontal oscillation. The vibrating beam 102 may have one or more connection components 120 that serve to connect a frame 118 with the vibrating beam 102 at the nodal point 126 of the vibrating beam 102.

The vibrating beam 102 in one example is supported by a flexure component 122 connected to the frame 118 through top and bottom covers (not shown). The flexure component 122 allows movement of the vibrating beam 102 about the nodal point 126 upon occurrence of an angular rate. For example, the angular rate is about the longitudinal axis of the vibrating beam. Pickoff sensors and processing components measure and translate the movement of the vibrating beam 102 into a signal representing the direction and magnitude of the angular rate.

The flexure component 122 allows horizontal and vertical oscillation of the vibrating beam 102 about the nodal point 126. The flexure component 122 may have a reduced section of the vibrating beam 102 that lies along a center line of a longitudinal axis of the vibrating beam 102. The nodal point 126 in one example is internal to the vibrating beam 102. For example, the vibrating beam 102 may have one or more apertures 124 that expose an area around the nodal point 126. The aperture 124 in one example passes through the vibrating beam 102. The aperture 124 surrounds the nodal point 126 and the flexure component 122 to provide space for movement of the vibrating beam 102. The aperture 124 is near the nodal point 126. The aperture 124 allows the frame 118 to support the vibrating beam substantially near the nodal point 126. The aperture 124 may have an open space etched from a surface of the vibrating beam 102 to expose the nodal point 126 and form the flexure component 122.

To initialize an angular rate sensing gyroscope, the drive components of the drive/sensor components 105, 106, 110, and 112 cause a first oscillation of the vibrating beam 102. An angular rate of the vibrating beams 102 about its longitudinal axes and the first oscillation induce a Coriolis force on the vibrating beam 102. The Coriolis force causes a second oscillation of the vibrating beam 102. The second oscillation is substantially perpendicular to the first oscillation. Feedback components in one example provide feedback on a magnitude of the first oscillation to the drive component 106 for regulation of the first oscillation. The sensor components of the drive/sensor components 105, 106, 110, and 112 pickoff the second oscillations and apply control signals to null the pickoff signal. The control signals are a measure of the magnitude and polarity of the angular rate of the vibrating beam 102.

The drive components of the drive/sensor components 105, 106, 110, and 112 in one example may have electrostatic drive components, magnetic drive and/or piezoelectric drive components. The sensor components of the drive/sensor components 105, 106, 110, and 112 in one example may have capacitive pickoff sensors, magnetic pickoff sensors, piezoresistive sensors, and/or piezoelectric pickoff sensors.

The output signal of a gyro with zero input angular rate is referred to as ZRO (Zero Rate Output), or gyro bias, and is considered an error signal. In typical applications, such as inertial measure units (IMU) and inertial navigation systems (INS), a calibration procedure is performed and a model of the gyro bias over temperature is measured and stored in the system processor. The model is applied as an error correction to the measured angular rate. The un-modelable portion of the bias that is unstable and non-repeatable remains an error in the measured angular rate and typically limits the position accuracy over time of inertial navigation systems.

Gyros can be divided into two categories depending on the principle of operation. In the first category are Coriolis based gyros which sense angular rate by measuring the force acting on a sensing body moving in a rotating frame with a velocity component normal to the axis of rotation. The motion of the sensing body may be either continuous as in a spinning wheel or vibratory as in a tuning fork or bell. In the second category are Sagnac based gyros which sense angular rate by measuring the difference in the transit time of counter-propagating light signals due to the constant velocity of light. This relativistic effect results in the splitting of the frequency of the counter-propagating light signals in ring laser gyros (RLG) or a phase difference the counter-propagating light signals in fiber optic gyros (FOG).

Coriolis Vibratory Gyros (CVG) are further subdivided into Class I and Class II. An example of a Class I CVG is the tuning fork gyro. An example of a Class II CVG is the bell or hemispheric resonator gyro (HRG). Class II CVGs are geometrically symmetrical about their sensing or input axis and have degenerate, or nearly identical, resonant frequencies for the vibration along the principal elastic axes.

The output of a CVG is an AC signal that can be divided into two components. The first component is in-phase with the velocity of the vibrating sensing element and has an amplitude proportional to the input angular rate. The second component is in phase with the acceleration of the sensing element and is ninety degrees out phase, or in quadrature with the first component. The magnitudes of the in-phase angular rate signal and the quadrature signal are derived by demodulation of the gyro pickoff output if the gyro is run in an open loop mode, or by the amplitude of the sine and cosine phases of the feedback for closed loop servo operation. The phase is determined with respect to the drive signal for the sensing body. Phase errors in demodulation for open loop gyros, or re-modulation for closed loop gyros, cause a portion of the quadrature signal to be interpreted as angular rate and contribute to the gyro bias error.

Embodiments of the present method and apparatus may reduce, compensate, or eliminate in real time the sources of gyro bias and quadrature.

Figure 2:
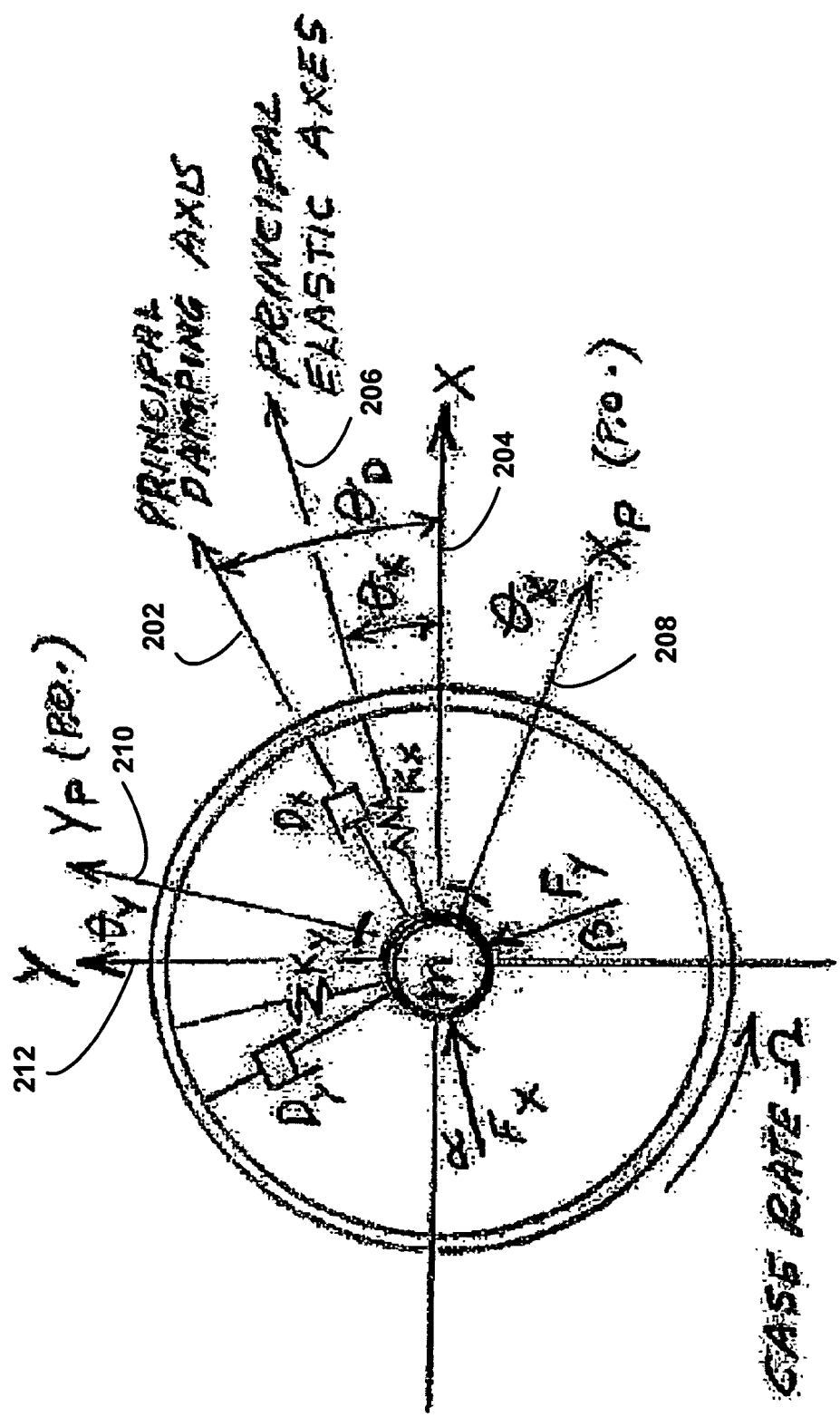
FIG. 2 is a diagram of an embodiment according to the present method and apparatus that explains the reason for driving the beam across the corners of the beam.

FIG. 2 is a diagram of an embodiment according to the present method and apparatus that explains the reason for driving the beam across the corners. The principal damping axis 202 is offset by $\theta_D$ from the X axis 204, and the principal elastic axis 206 is offset by $\theta_X$ from the X axis 204. $X_P$ 208 (X pickoff axis) is offset by $\theta_X$ from the X axis 204, and $Y_P$ 210 (Y pickoff axis) is offset by $\theta_Y$ from the Y axis 212.

The following equations describe bias and quadrature in a Class II CVG as a function of gyro parameters:

$$\text{Bias} = \sin 2\theta_\tau (1/\tau_1 - 1/\tau_2)/2k \text{ rad/sec}$$

$$\text{Quadrature} = \sin 2\theta_\omega (\omega_1 - \omega_2)/2k \text{ rad/sec}$$

where:

$\theta_\tau$=angle between vibration drive axis and principal damping axis;

$\theta_\omega$=angle between vibration drive axis and principal elastic axis;

$\tau_1$ and $\tau_2$=damping time constant in each of the principal damping axes;

$\omega_1$ and $\omega_2$=resonant frequency in each of the principal elastic axes; and k=geometry dependant scaling constant ~1 for beam.

A vibrating beam gyro may have a beam that is driven first in a direction normal to one pair of the beam faces while Coriolis coupled vibration is sensed along an axis normal to the orthogonal pair of faces for a first period. During a second period, the drive and sense axes are reversed. In the above equations both $\theta_\tau$ and $\theta_\omega$ are either increased or decreased by 90° when the orthogonal drive and sense axes are reversed. $2\theta_\tau$ and $2\theta_\omega$ are increased or decreased by 180° and therefore reverses the polarity of both bias and quadrature. The ability to reverse the polarity of the gyro bias and quadrature by interchanging the drive and sense axes is unique to Class II CVG. An algorithm may use the simultaneous measurement of angular rate by two gyros which have alternately reversing biases to solve the four simultaneous equations of the algorithm. The solution to the four simultaneous equations allows the continuous calculation of the bias of each gyro in an operational environment. The gyro biases are subtracted from the angular rate measured by each gyro and the compensated angular rate measurements are averaged to reduce the angle random walk by the square root of two.

An embodiment of the present method may continuously reduce the magnitude of both the gyro bias and quadrature, in real time, at the sensor level. The beam may be driven at 45° to the faces of the beam by applying drive signals to two orthogonal faces and sensing the Coriolis induced vibration in two orthogonal faces. The resulting 45° drive orientation closely matches the orientation of the principal elastic axis of the beam when small dimensional tolerances cause the resonant frequencies along the principal elastic axes to be slightly different. For similar reasons, small tolerance variations cause the principal damping axes to be oriented nearly 45° to the faces of the beam. The angles $\theta_\tau$ and $\theta_\omega$ while not being equal, may be less than 10°.

In the embodiment of the present method, a first step is to reduce the bias to zero. By increasing the drive signal on one face and decreasing the signal of the orthogonal face the angle between the drive axis and the principal damping axis, $\theta_\tau$, may be reduced to zero while maintaining a constant drive amplitude. The proportioning of the drive signal to the two orthogonal faces of the beam is controlled by a servo that nulls the bias that is being estimated. It should be noted that other sources of gyro bias may exist other than the differential time constant and that these bias sources may be compensated for by introducing an equal and opposite bias by servoing to a non-zero value for $\theta_\tau$.

A second step is to reduce the quadrature to zero. This is accomplished in one example by applying DC voltages to the drive and sense electrodes. These DC voltages, proportioned between the orthogonal faces of the beam, introduce a negative electrostatic spring which alters the orientation of the principal elastic axes of the beam. The magnitude and ratio of the DC voltages applied are servoed to align the principal elastic axes to the drive axis and reduce the quadrature portion of the rate servo to zero.

In gyro mechanizations in which the bias is not servoed to zero the quadrature may still be servoed to zero by either the application of DC voltages to align the principal elastic axes to the drive axis or by proportioning the drive signals to orient the drive axis to the principal elastic axis.

FIG. 3 depicts an embodiment of a method according to the present method. This embodiment of the method may have the steps of: providing a two-dimensional axisymmetric oscillator having a beam containing two principal elastic axes and two principal damping axes (301); driving the beam with drive components to oscillate across corners of the beam at approximately 45 degrees to sides of the beam (302); reducing a bias of the beam to zero (303); and reducing a quadrature of the beam to zero (304).

FIG. 4 depicts an embodiment of a method according to the present method. This embodiment of the method may have the steps of: providing a two-dimensional axisymmetric oscillator having a beam containing two principal elastic axes and two principal damping axes (401); driving the beam with drive components to oscillate across corners of the beam at approximately 45 degrees to sides of the beam (402); driving, during a first period, the beam along a drive axis of the beam in a direction normal to one pair of faces of the beam while Coriolis coupled vibration is sensed along a sense axis of the beam normal to an orthogonal pair of faces of the beam (403); reversing, during a second period, drive and sense axes driving the beam (404); reducing a bias of the beam to zero (405); and reducing a quadrature of the beam to zero (406).

The present apparatus in one example may comprise a plurality of components such as one or more of electronic components, hardware components, and computer software components. A number of such components may be combined or divided in the apparatus.

The steps or operations described herein only depict example embodiments. There may be many variations to these steps or operations without departing from the spirit of the invention. For instance, the steps may be performed in a differing order, or steps may be added, deleted, or modified.

Although various embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a class II coriolis vibratory gyro (CVG) having a beam;
drive components operatively coupled to the beam, the drive components driving the beam to oscillate with a Coriolis induced vibration in two orthogonal faces of the beam;
a bias that is equal to $\sin 2\theta_\tau (1/\tau_1 - 1/\tau_2)/2k$ rad/sec;
a quadrature that is equal to $\sin 2\theta_\omega (\omega_1 - \omega_2)/2k$ rad/sec;
where:
$\theta_\tau$=angle between vibration drive axis and principal damping axis;
$\theta_\omega$=angle between vibration drive axis and principal elastic axis;
$\tau_1$ and $\tau_2$=damping time constant in each of the principal damping axes;
$\omega_1$ and $\omega_2$=resonant frequency in each of the principal elastic axes; and
k=geometry dependant scaling constant; and
means for reducing the bias to substantially zero; and
means for reducing the quadrature to substantially zero.

2. The apparatus according to claim 1, wherein a magnitude of gyro bias and quadrature of the gyro has a continuous reduction in real time.

3. A method, comprising:
providing a class II coriolis vibratory gyro (CVG) having a beam, a bias of the gyro being equal to $\sin 2\theta_\tau (1/\tau_1 - 1/\tau_2)/2k$ rad/sec, and a quadrature of the gyro being equal to $\sin 2\theta_\omega (\omega_1 - \omega_2)/2k$ rad/sec;
where:
$\theta_\tau$=angle between vibration drive axis and principal damping axis;
$\theta_\omega$=angle between vibration drive axis and principal elastic axis;
$\tau_1$ and $\tau_2$=damping time constant in each of the principal damping axes;

$\omega_1$ and $\omega_2$ = resonant frequency in each of the principal elastic axes; and k = geometry dependant scaling constant; and reducing a bias to zero; and reducing a quadrature to zero; and driving the beam to oscillate with a Coriolis induced vibration in two orthogonal faces of the beam.

4. The method according to claim 3, wherein a servo is operatively coupled to the gyro, and wherein the method further comprises controlling, by a servo that nulls a bias that is being estimated, proportioning of a drive signals of drive signals to two orthogonal face of a beam of the gyro.

5. The method according to claim 3, wherein the gyro is driven by drive and sense electrodes that are operatively coupled to the gyro, and wherein in the step of reducing a quadrature of the gyro to zero, the method further comprises:

applying DC voltages to the drive and sense electrodes, the DC voltages, proportioned between the orthogonal faces of the beam, introducing a negative electrostatic spring which alters orientation of the principal elastic axes of a beam of the gyro.

6. The method according to claim 5, wherein a rate servo is operatively coupled to the gyro, and wherein magnitude and ratio of the DC voltages are servoed to align the principal elastic axes to a drive axis and reduce a quadrature portion of the rate servo to zero.

7. An apparatus, comprising:

a beam in a vibrating beam gyro;

drive components operatively coupled to the beam, the drive components driving the beam to oscillate;

a Coriolis induced vibration in two orthogonal faces of the beam;

means for reducing a bias of the beam to zero; and means for reducing a quadrature of the beam to zero.

8. The apparatus according to claim 7, wherein the drive components drive the beam to oscillate across corners of the beam at approximately 45 degrees to sides of the beam, wherein resulting 45° drive orientation closely matches an orientation of a principal elastic axis of the beam when small dimensional tolerances cause resonant frequencies along the principal elastic axes to be different.

9. The apparatus according to claim 7, wherein the drive components drive the beam to oscillate across corners of the beam at approximately 45 degrees to sides of the beam, wherein small tolerance variations of the beam cause principal damping axes to be oriented substantially 45° to faces of the beam.

10. The apparatus according to claim 7, wherein a magnitude of gyro bias and quadrature of the gyro has a continuous reduction in real time.

11. The apparatus according to claim 7, wherein the beam is a vibrating beam, and wherein the vibrating beam comprises a prism substantially symmetric for oscillation in first and second directions.

12. The apparatus according to claim 11, wherein the first direction is substantially perpendicular to the second direction.

13. The apparatus according to claim 12, wherein the beam is a vibrating beam, and wherein the apparatus further comprises a frame that supports the vibrating beam in a plane, wherein the first direction comprises an in-plane direction, and wherein the second direction comprises an out-of-plane direction.

14. A method, comprising:

providing a two-dimensional axisymmetric oscillator having a beam containing two principal elastic axes and two principal damping axes;

driving the beam with drive components to oscillate;

reducing a bias of the beam to zero; and reducing a quadrature of the beam to zero.

15. The method according to claim 14, wherein the method further comprises reducing, by increasing a drive signal on one face of the beam and decreasing a signal of the orthogonal face of the beam, an angle, between a drive axis of the beam and a principal damping axis of the beam, to zero while maintaining a constant drive amplitude.

16. The method according to claim 15, wherein a servo is operatively coupled to the beam, and wherein the method further comprises controlling, by a servo that nulls a bias that is being estimated, proportioning of a drive signal to two orthogonal faces of the beam.

17. The method according to claim 14, wherein the beam is driven by drive and sense electrodes that are operatively coupled to the beam, and wherein in the step of reducing a quadrature of the beam to zero, the method further comprises:

applying DC voltages to the drive and sense electrodes;

proportioning, via the DC voltages, between orthogonal faces of the beam, to thereby introduce a negative electrostatic spring which alters orientation of the principal elastic axes of the beam.

18. The method according to claim 17, wherein a rate servo is operatively coupled to the oscillator, and wherein magnitude and ratio of the DC voltages are servoed to align the principal elastic axes to a drive axis and reduce a quadrature portion of the rate servo to zero.

19. A method, comprising:

providing a two-dimensional axisymmetric oscillator having a beam containing two principal elastic axes and two principal damping axes;

driving the beam with drive components to oscillate across corners of the beam at approximately 45 degrees to sides of the beam;

driving, during a first period, the beam along a drive axis of the beam in a direction normal to one pair of faces of the beam while Coriolis coupled vibration is sensed along a sense axis of the beam normal to an orthogonal pair of faces of the beam;

reversing, during a second period, drive and sense axes driving the beam;

reducing a bias of the beam to zero; and reducing a quadrature of the beam to zero.

20. The method according to claim 19, wherein the method further comprises reducing, by increasing a drive signal on one face of the beam and decreasing a signal of the orthogonal face of the beam, an angle, between a drive axis of the beam and a principal damping axis of the beam, to zero while maintaining a constant drive amplitude.

21. The method according to claim 20, wherein a servo is operatively coupled to the beam, and wherein the method further comprises controlling, by a servo that nulls a bias that is being estimated, proportioning of a drive signal to two orthogonal faces of the beam.

22. The method according to claim 21, wherein the beam is driven by drive and sense electrodes that are operatively coupled to the beam, and wherein in the step of reducing a quadrature of the beam to zero, the method further comprises:

applying DC voltages to the drive and sense electrodes;

proportioning, via the DC voltages, between orthogonal faces of the beam, to thereby introduce a negative electrostatic spring which alters orientation of the principal elastic axes of the beam.

23. The method according to claim 19, wherein a rate servo is operatively coupled to the oscillator, and wherein magnitude and ratio of the DC voltages are servoed to align the principal elastic axes to a drive axis and reduce a quadrature portion of the rate servo to zero.

24. The method according to claim 23, wherein the drive components comprise at least one of electrostatic drive components, magnetic drive and piezoelectric drive components.

25. The method according to claim 19, wherein the method further comprises sensing the beam with sensor components, and wherein the sensor components comprise at least one of capacitive pickoff sensors, magnetic pickoff sensors, piezoresistive sensors, and piezoelectric pickoff sensors.

26. The method according to claim 19, wherein a resulting 45° drive orientation substantially matches an orientation of the principal elastic axis of the beam when small dimensional tolerances cause resonant frequencies along the principal elastic axes to be different.

* * * * *